(12) United States Patent
Wang et al.

(10) Patent No.: US 9,493,641 B2
(45) Date of Patent: Nov. 15, 2016

(54) RESIN COMPOSITIONS FOR EXTRUSION COATING

(75) Inventors: Jian Wang, Rosharon, TX (US); Mehmet Demirors, Pearland, TX (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 474 days.

(21) Appl. No.: 13/157,428

(22) Filed: Jun. 10, 2011

(65) Prior Publication Data

US 2012/0316284 A1     Dec. 13, 2012

(51) Int. Cl.
| | | |
|---|---|---|
| C08L 23/00 | (2006.01) | |
| C08L 23/08 | (2006.01) | |
| C08L 23/06 | (2006.01) | |
| C09D 123/08 | (2006.01) | |

(52) U.S. Cl.
CPC ............ C08L 23/0815 (2013.01); C08L 23/06 (2013.01); C09D 123/0815 (2013.01)

(58) Field of Classification Search
CPC .................................................. C08L 23/0815
USPC ........................................................ 525/240
See application file for complete search history.

(56) References Cited

U.S. PATENT DOCUMENTS

| | | | |
|---|---|---|---|
| 3,645,992 A | 2/1972 | Elston et al. | |
| 3,914,342 A | 10/1975 | Mitchell | |
| 4,076,698 A | 2/1978 | Anderson et al. | |
| 4,339,507 A | 7/1982 | Kurtz et al. | |
| 4,486,552 A | 12/1984 | Niemann | |
| 5,272,236 A | 12/1993 | Lai et al. | |
| 5,278,272 A | 1/1994 | Lai et al. | |
| 5,582,923 A * | 12/1996 | Kale et al. | 428/523 |
| 5,674,342 A | 10/1997 | Obijeski et al. | |
| 5,733,155 A | 3/1998 | Sagawa | |
| 5,777,155 A | 7/1998 | Sato et al. | |
| 5,854,045 A | 12/1998 | Fang et al. | |
| 6,110,599 A | 8/2000 | Edwards et al. | |
| 6,114,456 A | 9/2000 | Dewart et al. | |
| 6,291,590 B1 * | 9/2001 | Sainio et al. | 525/191 |
| 6,800,692 B2 | 10/2004 | Farley et al. | |
| 2011/0124254 A1 * | 5/2011 | Oswald et al. | 442/62 |
| 2012/0130006 A1 * | 5/2012 | Van Den Bossche et al. | 524/528 |

FOREIGN PATENT DOCUMENTS

| | | |
|---|---|---|
| EP | 1849805 A1 | 10/2007 |
| EP | 2123707 B1 | 10/2010 |
| NL | 1018167 C2 | 12/2002 |
| WO | WO-2005/023912 A2 | 3/2005 |

OTHER PUBLICATIONS

PCT/US12/041094, International Search Report and Written Opinion of the International Searching Authority.

* cited by examiner

*Primary Examiner* — Irina Krylova

(74) *Attorney, Agent, or Firm* — Cantor Colburn LLP

(57) ABSTRACT

This invention pertains to polyethylene extrusion compositions. In particular, the invention pertains to ethylene polymer extrusion compositions having high drawdown and substantially reduced neck-in. The compositions comprise from 40 to 90% by weight of the composition of a first polyethylene composition, said first polyethylene composition comprising a linear low density polyethylene having a density in the range of from 0.90 to 0.96 g/cm$^3$, and a melt index ($I_2$) of from 5 to 15 g/10 min; and from 1 to 10% by weight of the composition of a second polyethylene composition, said second polyethylene composition comprising a high pressure low density polyethylene having a density in the range of from 0.915 to 0.930 g/cm$^3$, and a melt index of from 0.1 to 3 g/10 min; and from 10 to 50% by weight of the composition of a third polyethylene composition, said third polyethylene composition comprising a high pressure low density polyethylene having a density in the range of from 0.915 to 0.930 g/cm$^3$, and a melt index of from 5 to 15 g/10 min.

12 Claims, No Drawings

RESIN COMPOSITIONS FOR EXTRUSION COATING

FIELD OF THE INVENTION

This invention pertains to polyethylene extrusion compositions. In particular, the invention pertains to ethylene polymer extrusion compositions having high drawdown and substantially reduced neck-in. The invention also pertains to a method of making the ethylene polymer extrusion composition and a method for making an extrusion coated article, an article in the form of an extrusion profile and an article in the form of an extrusion cast film.

BACKGROUND AND SUMMARY OF THE INVENTION

It is known that low density polyethylene (LDPE) made by high-pressure polymerization of ethylene with free-radical initiators as well as homogeneous or heterogeneous linear low density polyethylene (LLDPE) and ultra low density polyethylene (ULDPE) made by the copolymerization of ethylene and α-olefins with metallocene or Ziegler coordination (transition metal) catalysts at low to medium pressures can be used, for example, to extrusion coat substrates such as paper board, paper, and/or polymeric substrates; to prepare extrusion cast film for applications such as disposable diapers and food packaging; and to prepare extrusion profiles such as wire and cable jacketing. However, although LDPE generally exhibits excellent extrusion processability and high extrusion drawdown rates, LDPE extrusion compositions lack sufficient abuse resistance and toughness for many applications. For extrusion coating and extrusion casting purposes, efforts to improve abuse properties by providing LDPE compositions having high molecular weights (i.e., having melt index, $I_2$, less than about 2 g/10 min) are not effective since such compositions inevitably have too much melt strength to be successfully drawn down at high line speeds.

While LLDPE and ULDPE extrusion compositions offer improved abuse resistance and toughness properties and MDPE (medium density polyethylene) extrusion compositions offer improved barrier resistance (against, for example, moisture and grease permeation), these linear ethylene polymers exhibit unacceptably high neck-in and draw instability; they also exhibit relatively poor extrusion processability compared to pure LDPE. One proposal commonly used in the industry is to blend LDPE with LLDPE. With LDPEs currently used, large amounts (e.g. more than 60%) of LDPE must be used in order to achieve the required neck-in. In some circumstances, the availability of LDPE may be limited, or there may be other reasons for desiring a lower level of LDPE, without unduly increasing neck-in. It has been discovered that if two different LDPE resins are used, one having a density in the range of from 0.915 to 0.930 g/cm³, and a melt index of from 0.1 to 3 g/10 min, and another having a density in the range of from 0.915 to 0.930 g/cm³, and a melt index of from 5 to 15 g/10 min, that less of the total amount of LDPE (for example less than 50%) is needed to achieve the same neck-in. This also allows the LLDPE portion to be more carefully tailored to meet particular requirements such as sealability or toughness.

It is generally believed that neck-in and melt strength are inversely related. Thus, in references such as U.S. Pat. Nos. 5,582,923 and 5,777,155 to Kale et al. (each of which is hereby incorporated by reference in its entirety), adding LLDPE to improve physical toughness came at the expense of extrudability factors such as increased neck-in. Thus in the extrusion coating industry, current practice is to utilize lower melt index LDPE for extrusion on equipment with narrower die widths and relatively low maximum take off rates. Such low melt index autoclave LDPE resins provide low neck-in (less than about 2.5 inches (1.25 inch for each side)) and sufficient draw-down speed. This is typically with older equipment. Faster equipment, typically with wider die widths and improved internal deckling, is supplied with higher melt index autoclave LDPE, which unfortunately, tends to yield greater neck-in.

In the preferred practice of the present invention the neck-in is less than approximately two and a half inches (1.25" per side) at a haul-off rate of approximately 880 feet/minute. The neck-in generally decreases with increasing haul-off rates, making neck-in particularly problematic when using older equipment which is limited in the haul off rates obtainable. The practical range of melt index is from about 3 to about 30 g/10 min in most coating applications, and the compositions of the present invention can cover this entire range. It is desirable that the maximum operating speed of the extrusion coating equipment not be limited by the properties of the resin being used. Thus it is desirable to use resin which exhibits neither draw instability nor breaking before the maximum line speed is reached. It is even more desirable that such resin exhibit very low neck-in, less than about 2.5 inches. The resins provided in this invention exhibit low neck-in and excellent draw stability while the draw-down capability required is obtained by selecting the correct melt index. Typically the melt index of the overall blend is in the range of 5-15 g/10 min. It is a further feature of this invention that it provides a resin composition at for example 8 MI that will be suitable for extrusion on both older equipment having slow take-off and modern high speed equipment. In both situations the neck-in can be less than 2.5 inches.

It has been discovered that at a fixed melt index, the higher the melt strength of the overall composition, the lower the neck-in which will be observed. In general it is preferred that the composition will exhibit the following relationship: Melt strength (cN)×Melt Index (g/10 min) will be greater than or equal to 24. Preferably the Melt strength (cN)×Melt Index (g/10 min) is greater than or equal to 26, more preferably greater than 28.

LLDPE in the preferred blends for use in making the compositions of the present invention can be any LLDPE known in the art, and can be varied depending on the physical properties desired, as is generally known in the art.

Another aspect of the present invention is a process for improving extrusion coating performance by using the resins of the present invention.

DESCRIPTION OF THE PREFERRED EMBODIMENTS

The following terms shall have the given meaning for the purposes of this invention:

"Haul-Off" is defined herein to mean the speed at which the substrate is moving, thus stretching or elongating a molten polymer extrudate.

"Drawdown" is defined as the haul-off speed at which the molten polymer breaks from the die or the speed at which edge instability was noted.

"Melt strength" which is also referred to in the relevant art as "melt tension" is defined and quantified herein to mean the stress or force (as applied by a wind-up drum equipped with a strain cell) required to draw a molten extrudate at a haul-off velocity at which the melt strength plateaus prior to breakage rate above its melting point as it passes through the die of a standard plastometer such as the one described in ASTM D1238-E. Melt strength values, which are reported herein in centi-Newtons (cN), are determined using a Gottfert Rheotens at 190° C. Density is tested in accordance with ASTM D792.

"Neck-in" is defined herein as the difference between the die width and the extrudate width on the fabricated article. The neck-in values reported herein are determined at a haul off rate of 440 feet/minute which yields a 1 mil coating thickness as well as at a haul off rate of 880 feet/minute which yields a 0.5 mil coating thickness at an extrusion rate of approximately 250 lbs/hr, using a 3.5-inch diameter, 30:1 L/D Black-Clawson extrusion coater equipped with a 30 inch wide die deckled to 24 inches and having a 25-mil die gap.

The term "polymer", as used herein, refers to a polymeric compound prepared by polymerizing monomers, whether of the same or a different type. The generic term polymer thus embraces the term "homopolymer", usually employed to refer to polymers prepared from only one type of monomer as well as "copolymer" which refers to polymers prepared from two or more different monomers.

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, herein incorporated by reference).

The term "LLDPE" is defined to mean any linear or substantially linear polyethylene copolymer. The LLDPE can be made by any process such as gas phase, solution phase, or slurry or combinations thereof.

Testing Methods
Melt Index

Melt index, or $I_2$, is measured in accordance with ASTM D 1238-10, Condition 190° C./2.16 kg, and is reported in grams eluted per 10 minutes. The $I_{10}$ was measured in accordance with ASTM D 1238, Condition 190° C./10 kg, and was reported in grams per 10 minutes.

Density

Compression molded samples for density measurement are prepared according to ASTM D 4703. Density measurements are performed following ASTM D792, Method B within 2 hours of molding.

Dynamic Mechanical Spectroscopy

Resins were compression-molded into "3 mm thick×1 inch" circular plaques at 350° F. for five minutes, under 1500 psi pressure in air. The sample was then taken out of the press, and placed on the counter to cool.

A constant temperature frequency sweep was performed using a TA Instruments "Advanced Rheometric Expansion System (ARES)," (New Castle, Del.) equipped with 25 mm (diameter) parallel plates, under a nitrogen purge. The sample was placed on the plate, and allowed to melt for five minutes at 190° C. The plates were then closed to a gap of 2 mm, the sample trimmed (extra sample that extends beyond the circumference of the "25 mm diameter" plate is removed), and then the test was started. The method had an additional five minute delay built in, to allow for temperature equilibrium. The experiments were performed at 190° C. over a frequency range of 0.1 to 100 rad/s. The strain amplitude was constant at 10%. The stress response was analyzed in terms of amplitude and phase, from which the storage modulus (G'), loss modulus (G"), complex modulus (G*), complex viscosity η*, tan (δ) or tan delta, viscosity at 0.1 rad/s (V0.1), the viscosity at 100 rad/s (V100), and the Viscosity Ratio (V0.1/V100) were calculated.

Melt Strength

Melt strength measurements were conducted on a Gottfert Rheotens 71.97 (Göettfert Inc.; Rock Hill, S.C.), attached to a Gottfert Rheotester 2000 capillary rheometer. The melted sample (about 25 to 30 grams) was fed into the barrel (L=300 mm, Diameter=12 mm) of the Göettfert Rheotester 2000 capillary rheometer, equipped with a flat entrance angle (180 degrees) of length of 30 mm, diameter of 2.0 mm, and an aspect ratio (length/diameter) of 15. After equilibrating the samples at 190° C. for 10 minutes, the piston was run at a constant piston speed of 0.265 mm/second, which corresponds to a wall shear rate of 38.2 $s^{-1}$ at the given die diameter. The standard test temperature was 190° C. The sample was drawn uniaxially to a set of accelerating nips located 100 mm below the die, with an acceleration of 2.4 $mm/s^2$. The tensile force was recorded as a function of the take-up speed of the nip rolls. Melt strength was reported as the plateau force (cN) before the strand broke. The following conditions were used in the melt strength measurements: plunger speed=0.265 mm/second; wheel acceleration=2.4 $mm/s^2$; capillary diameter=2.0 mm; capillary length=30 mm; and barrel diameter=12 mm.

Triple Detector Gel Permeation Chromatography (TDGPC)—Conventional GPC

For the GPC techniques used herein (Conventional GPC, Light Scattering GPC), a Triple Detector Gel Permeation Chromatography (3D-GPC or TDGPC) system was used. This system consists of a Waters (Milford, Mass.) model 150 C High Temperature Chromatograph (other suitable high temperatures GPC instruments include Polymer Laboratories (Shropshire, UK) Model 210 and Model 220), equipped with a Precision Detectors (Amherst, Mass.) 2-angle laser light scattering (LS) detector Model 2040, an IR4 infra-red detector from Polymer ChAR (Valencia, Spain), and a Viscotek (Houston, Tex.) 150R 4-capillary solution viscometer (DP).

A GPC with these latter two independent detectors and at least one of the former detectors is sometimes referred to as "3D-GPC" or "TDGPC," while the term "GPC" alone generally refers to conventional GPC. Data collection is performed using Viscotek TriSEC software, Version 3, and a 4-channel Viscotek Data Manager DM400. The system is also equipped with an on-line solvent degassing device from Polymer Laboratories (Shropshire, United Kingdom).

The eluent from the GPC column set flows through each detector arranged in series, in the following order: LS detector, IR4 detector, then DP detector. The systematic approach for the determination of multi-detector offsets is performed in a manner consistent with that published by Balke, Mourey, et al. (Mourey and Balke, Chromatography Polym., Chapter 12, (1992)) (Balke, Thitiratsakul, Lew, Cheung, Mourey, Chromatography Polym., Chapter 13, (1992)), optimizing triple detector log (MW and intrinsic viscosity) results from using a broad polyethylene standard, as outlined in the section on Light Scattering (LS) GPC below in the paragraph following Equation (5).

Suitable high temperature GPC columns can be used, such as four 30 cm long Shodex HT803 13 micron columns, or four 30 cm Polymer Labs columns of 20-micron mixed-pore-size packing (MixA LS, Polymer Labs). Here, the MixA LS columns were used. The sample carousel compartment is operated at 140° C., and the column compartment is operated at 150° C. The samples are prepared at a concentration of "0.1 grams of polymer in 50 milliliters of solvent." The chromatographic solvent and the sample preparation solvent is 1,2,4-trichlorobenzene (TCB) containing 200 ppm of 2,6-di-tert-butyl-4methylphenol (BHT). The solvent is sparged with nitrogen. The polymer samples are gently stirred at 160° C. for four hours. The injection volume is 200 microliters. The flow rate through the GPC is set at 1 ml/minute.

Conventional GPC

For Conventional GPC, the IR4 detector is used, and the GPC column set is calibrated by running 21 narrow molecular weight distribution polystyrene standards. The molecular weight (MW) of the standards ranges from 580 g/mol to 8,400,000 g/mol, and the standards are contained in 6 "cocktail" mixtures. Each standard mixture has at least a decade of separation between individual molecular weights. The standard mixtures are purchased from Polymer Laboratories. The polystyrene standards are prepared at "0.025 g in 50 mL of solvent" for molecular weights equal to or greater than 1,000,000 g/mol, and at "0.05 g in 50 mL of solvent" for molecular weights less than 1,000,000 g/mol. The polystyrene standards are dissolved at 80° C., with gentle agitation, for 30 minutes. The narrow standards mixtures are run first, and in order of decreasing highest molecular weight component to minimize degradation. The polystyrene standard peak molecular weights are converted to polyethylene molecular weight using Equation (1) (as described in Williams and Ward, J. Polym. Sci., Polym. Letters, 6, 621 (1968)):

$$M\text{polyethylene} = A \times (M\text{polystyrene})^B \quad \text{(Eq. 1)},$$

where M is the molecular weight of polyethylene or polystyrene (as marked), and B is equal to 1.0. It is known to those of ordinary skill in the art that A may be in a range of about 0.38 to about 0.44, and is determined at the time of calibration using a broad polyethylene standard, as outlined in the section on Light Scattering (LS) GPC below in the paragraph following Equation (5). Use of this polyethylene calibration method to obtain molecular weight values, such as the molecular weight distribution (MWD or Mw/Mn), and related statistics, is defined here as the modified method of Williams and Ward. The number average molecular weight, the weight average molecular weight, and the z-average molecular weight are calculated from the following equations.

$$Mw_{CC} = \sum_i \left( \frac{C_i}{\sum_i C_i} \right) M_i = \sum_i w_i M_{cc,i} \quad \text{(Eq. 2)}$$

$$M_{n,cc} = \sum_i w_i / \sum_i (w_i / M_{cc,i}) \quad \text{(Eq. 3)}$$

$$M_{z,cc} = \sum (w_i M_{cc,i}^2) / \sum (w_i M_{cc,i}) \quad \text{(Eq. 4)}$$

Description of the Composition

The compositions of the present invention comprise at least three components. The first component, which is a linear low density polyethylene, comprises from 40 to 90% by weight of the composition, preferably greater than or equal to 50, more preferably greater than or equal to 60 percent by weight of the overall composition.

In an embodiment, the first polyethylene component comprises from 60 to 80% by weight of the composition.

Any type of Linear PE can be used in the blends which make up the preferred compositions of the present invention. This includes the substantially linear ethylene polymers which are further defined in U.S. Pat. No. 5,272,236, U.S. Pat. No. 5,278,272, U.S. Pat. No. 5,582,923 and U.S. Pat. No. 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. No. 3,914,342 or U.S. Pat. No. 5,854,045). Each of these references is incorporated herein by reference. The Linear PE can be made via gas-phase, solution-phase or slurry polymerization or any combination thereof, using any type of reactor or reactor configuration known in the art. Similarly, the Linear PE may be monomodal or multimodal in terms of average molecular weight.

In an embodiment, the first polyethylene composition has a MWD greater than 4. In another embodiment, the first polyethylene composition has a MWD less than 4.

When used in the present invention, the Linear PE preferably has a melt index of from 5 to 15 g/10 min or greater, more preferably from 7 to 12 g/10 min.

The Linear PE also has a density of from 0.90 to 0.96 g/cm$^3$, preferably 0.905 to 0.92 g/cm3.

The compositions of the present invention also comprise a second polyethylene resin which comprises a high pressure low density polyethylene. The second polyethylene comprises from 1 to 10 percent by weight of the total composition, alternatively from 2 to 5 percent. In general the more of this resin which can be included, the less of the LLDPE component which is needed to achieve good neck-in properties; however at levels such as from 2 to 5 percent, this component can conveniently be added via side-arm. Such LDPE materials are well known in the art and include resins made in autoclave or tubular reactors. The preferred LDPE for use as the second polyethylene has a density in the range of from 0.915 to 0.930 g/cm$^3$. The preferred LDPE for use in the second polyethylene has a melt index of from 0.4 to 2.5 g/10 min, preferably less than or equal to 1 g/10 min.

The compositions of the present invention also comprise a third polyethylene resin which also comprises a high pressure low density polyethylene. The third polyethylene comprises from 10 to 50 percent by weight of the total composition, more preferably from 15 to 35 percent. Such LDPE materials are well known in the art and include resins made in autoclave or tubular reactors. The preferred LDPE for use as the third polyethylene has a density in the range of from 0.915 to 0.930 g/cm$^3$. The preferred LDPE for use in the third polyethylene has a melt index of from 5 to 15 g/10 min, preferably from 7 to 12 g/10 min.

The overall composition preferably has a melt index of from 5 to 15 g/10 min, preferably from 7 to 12/g/10 min, and a density of from 0.90 to 0.96 g/cm$^3$.

Additives such as antioxidants (e.g., hindered phenolics such as Irganox® 1010 or Irganox® 1076 supplied by Ciba Geigy), phosphites (e.g., Irgafos® 168 also supplied by Ciba Geigy), cling additives (e.g., PIB), Standostab PEPQ® (supplied by Sandoz), pigments, colorants, fillers, and the like can also be included in the ethylene polymer extrusion composition of the present invention, to the extent that they do not interfere with the high drawdown and substantially reduced neck-in discovered by Applicants. These compositions preferably contain no or only limited amounts of antioxidants as these compounds may interfere with adhesion to the substrate. The article made from or using the inventive composition may also contain additives to enhance antiblocking and coefficient of friction characteristics including, but not limited to, untreated and treated silicon dioxide, talc, calcium carbonate, and clay, as well as primary, secondary and substituted fatty acid amides, chill roll release agents, silicone coatings, etc. Other additives may also be added to enhance the anti-fogging characteristics of, for example, transparent cast films, as described, for example, by Niemann in U.S. Pat. No. 4,486,552, the disclosure of which is incorporated herein by reference. Still other additives, such as quaternary ammonium compounds alone or in combination with ethylene-acrylic acid (EAA) copolymers or other functional polymers, may also be added to enhance the antistatic characteristics of coatings, profiles and films of this invention and allow, for example, the packaging or making of electronically sensitive goods. Other functional polymers such as maleic anhydride grafted polyethylene may also be added to enhance adhesion, especially to polar substrates.

The preferred blends for making the polymer extrusion compositions of this invention can be prepared by any suitable means known in the art including tumble dry-blending, weigh feeding, solvent blending, melt blending via compound or side-arm extrusion, or the like as well as combinations thereof. Surprisingly, in view of the melt index difference between the low melt index LDPE component and the higher melt index component, either Linear PE or LDPE, these blends do not require special mixing procedures to prevent gels.

The inventive extrusion composition can also be blended with other polymer materials, such as polypropylene, high pressure ethylene copolymers such as ethylene vinylacetate (EVA), ethylene ethylacrylate (EEA), and ethylene acrylic acid (EAA) and the like, ethylene-styrene interpolymers, so long as the necessary rheology and molecular architecture as evidenced by multiple detector GPC are maintained. The composition can be used to prepare monolayer or multilayer articles and structures, for example, as a sealant, adhesive or tie layer. The other polymer materials can be blended with the inventive composition to modify processing, film strength, heat seal, or adhesion characteristics as is generally known in the art.

The ethylene polymer extrusion compositions of this invention, whether of monolayer or multilayered construction, can be used to make extrusion coatings, extrusion profiles and extrusion cast films as is generally known in the art. When the inventive composition is used for coating purposes or in multilayered constructions, substrates or adjacent material layers can be polar or nonpolar including for example, but not limited to, paper products, metals, ceramics, glass and various polymers, particularly other polyolefins, and combinations thereof. For extrusion profiling, various articles can potentially be fabricated including, but not limited to, refrigerator gaskets, wire and cable jacketing, wire coating, medical tubing and water piping, where the physical properties of the composition are suitable for the purpose. Extrusion cast film made from or with the inventive composition can also potentially be used in food packaging and industrial stretch wrap applications.

EXPERIMENTAL

In order to demonstrate the effectiveness of the compositions of the present invention the following experiments are run.

The linear low density polyethylene, "LLDPE-1" is produced in a dual reactor solution process with constrained geometry catalysts used in both reactors. LLDPE-1 is more completely described in Table 1.

LDPE-1 is a high pressure low density polyethylene made in an autoclave reactor. LDPE-1 is more completely described in Table 1

LDPE-2 is a high pressure low density polyethylene made in an autoclave reactor. LDPE-2 is more completely described in Table 1

Blending

The LLDPE component and the two LDPE components are compounded in an 18 mm twin screw extruder (micro-18). The twin screw extruder used is a Leistritz machine controlled by Haake software. The extruder has five heated zones, a feed zone, and a 3 mm strand die. The feed zone is cooled by flowing river water, while the remaining zones 1-5 and die are electrically heated and air cooled to 120, 135, 150, 190, 190, and 190° C. respectively. The pellet blend components are combined in a plastic bag and tumble blended by hand. After preheating the extruder, the load cell and die pressure transducers are calibrated. The drive unit for the extruder is run at 200 rpm which results by gear transfer to a screw speed of 250 rpm. The dry blend is then fed (6-8 lbs/hr) to the extruder through a twin auger K-Tron feeder model # K2VT20 using pellet augers. The hopper of the feeder is padded with nitrogen and the feed cone to the extruder is sealed with foil to minimize air intrusion to minimize possible oxygen degradation of the polymer. The resulting strand is water quenched, dried with an air knife, and pelletized with a Conair chopper.

A total of four blends are made at different blending ratios as listed in Table 2. In each blend, the sum of the LDPE components is kept at a constant 30% and the LLDPE component is kept at 70%.

Extrusion Coating

All coating experiments are performed on a Black-Clawson extrusion coating/lamination line. The amount of neck-in (the difference in actual coating width versus deckle width with a 6" (15 cm) air gap) is measured at 440 fpm and 880 fpm resulting in 1 mil and ½ mil coatings respectively. Drawdown is the speed at which edge imperfections were noticed or that speed at which the molten curtain completely tears from the die. Although the equipment is capable of haul-off speeds of 3000 fpm, in these experiments the maximum speed used was 1500 fpm. This is normal operation and is done to conserve paper and maximize the number of experiments that can be done on the machine for each roll of paper board purchased. Motor current is also recorded on the 150 horsepower 3½ inch diameter extruder during screw speeds of approximately 90 rpm resulting in 250 lb/h throughput. The amount of backpressure is recorded for each polymer without changing the valve position. Blends of the various components are produced by weighing out the pellets according to the ratios listed in Table 2 and then tumble blending samples until a homogenous blend is obtained (approximately 30 minutes for each sample).

Result Discussions:

The characterization data for the pure components used in the blends are listed in Table 1. In each of the four blends, the sum of the LDPE components is kept at a constant 30% and the LLDPE component is kept at 70%. Therefore, the improvement in melt strength and neck in performance of the inventive examples can be considered as only due to the presence of two LDPE components and not because of higher level of LDPE in the blend. These four blends were characterized, with the results shown in Table 2. It can be seen from the table that despite the increased level of the fractional LDPE in the inventive examples, the overall melt index remains about the same, and no significant changes in $I_{10}/I_2$ are observed. In DMS shear rheology, the inventive examples show no significant increase in viscosity, with only a slight increase in elasticity (tan delta drops slightly). The most significant improvement is in melt strength, which increased from 2.9 cN to 3.6 cN in example 3, a 24% improvement. It is known that melt strength is critical for reducing neck-in in extrusion coating. It should be noted that in this study the melt strength improvement is not at the cost of reducing melt index or sacrificing the resin's extrudability in the extruder. This can be seen clearly in Table 3 where the horse power, the amperage and the melt temperature remain about the same as compared to the comparative example, while the neck-in is significantly improved for the inventive examples and drawdown is improved as well. It is also found that the inventive examples meet the relationship below.

Melt strength×Melt index($I_2$)>24

Typically, the higher the melt strength at a fixed melt index, the lower the neck-in of the resin in extrusion coating.

TABLE 1

Melt Indices, Densities, DMS Viscosity, Melt strength, and TDGPC data from conventional calibration for the pure components of the blends.

| Sample Description | LLDPE-1 | LDPE-1 | LDPE-2 |
|---|---|---|---|
| Density (g/cm³) | 0.913 | 0.919 | 0.917 |
| $I_2$ (g/10 min) | 10.1 | 0.47 | 7.6 |
| $I_{10}/I_2$ | 9.6 | 13.7 | 9.6 |
| $M_n$ (conv) (g/mol) | 17580 | 12460 | 14510 |
| $M_w$ (conv) (g/mol) | 57260 | 259820 | 152760 |
| $M_z$ (conv) (g/mol) | 163600 | 1080100 | 594100 |
| $M_w/M_n$ (conv) | 3.26 | 20.85 | 10.53 |
| Eta 0.1 rad/s (Pa · s) | 1187 | 21677 | 2330 |
| Eta 1.0 rad/s (Pa · s) | 1033 | 8482 | 1560 |
| Eta 10 rad/s (Pa · s) | 701 | 2618 | 731 |
| Eta 100 rad/s (Pa · s) | 351 | 674 | 265 |
| Tan delta 0.1 rad/s | 20.7 | 1.7 | 5.8 |
| Melt strength (cN) | 0.4 | 23.9 | 7.4 |

TABLE 2

Melt Indices, Densities, DMS Viscosity, Melt strength, and TDGPC data from conventional calibration for the blends.

| Sample Description | Comparative Example 1 | Inventive Example 1 | Inventive Example 2 | Inventive Example 3 |
|---|---|---|---|---|
| Blend ratio | 70% LLDPE-1 + 30% LDPE-2 | 70% LLDPE-1 + 2.1% LDPE-1 + 27.9% LDPE-2 | 70% LLDPE-1 + 2.8% LDPE-1 + 27.2% LDPE-2 | 70% LLDPE-1 + 3.5% LDPE-1 + 26.5% LDPE-2 |
| Density (g/cm³) | 0.915 | 0.915 | 0.915 | 0.915 |
| $I_2$ (g/10 min) | 8.1 | 8.1 | 8.1 | 8.0 |
| $I_{10}/I_2$ | 9.6 | 9.1 | 9.0 | 9.1 |
| $M_n$ (conv) (g/mol) | 16390 | 16540 | 16830 | 16920 |
| $M_w$ (conv) (g/mol) | 85550 | 87910 | 84880 | 88480 |
| $M_z$ (conv) (g/mol) | 377800 | 396000 | 370100 | 392600 |
| $M_w/M_n$ (conv) | 5.22 | 5.31 | 5.04 | 5.23 |
| Eta 0.1 rad/s (Pa · s) | 1646 | 1703 | 1683 | 1786 |
| Eta 1.0 rad/s (Pa · s) | 1311 | 1345 | 1335 | 1396 |
| Eta 10 rad/s (Pa · s) | 770 | 790 | 778 | 812 |
| Eta 100 rad/s (Pa · s) | 340 | 349 | 342 | 357 |
| Tan delta 0.1 rad/s | 11.5 | 11.0 | 10.3 | 9.6 |
| Melt strength (cN) | 2.9 | 3.1 | 3.5 | 3.6 |
| Melt strength × $I_2$ | 23.5 | 25.2 | 27.9 | 28.6 |

TABLE 3

Neck-in, drawdown and other processing conditions at extrusion coating line for the blends.

| Sample Description | Comparative Example 1 | Inventive Example 1 | Inventive Example 2 | Inventive Example 3 |
|---|---|---|---|---|
| Blend ratio | 70% LLDPE-1 + 30% LDPE-2 | 70% LLDPE-1 + 2.1% LDPE-1 + 27.9% LDPE-2 | 70% LLDPE-1 + 2.8% LDPE-1 + 27.2% LDPE-2 | 70% LLDPE-1 + 3.5% LDPE-1 + 26.5% LDPE-2 |
| Neck-in at 440 fpm (inches) | 3½ | 3⅜ | 3 | 2⅞ |
| Neck-in at 880 fpm (inches) | 2⅞ | 2¾ | 2⅝ | 2½ |
| Drawdown (ft/min) | 1350 | >1500 | >1500 | >1500 |
| HP | 31 | 30 | 31 | 31 |
| Amps | 115 | 112 | 115 | 114 |
| Melt Temperature (F.) | 605 | 603 | 600 | 605 |

Although the invention has been described in considerable detail through the preceding description and examples, this detail is for the purpose of illustration and is not to be construed as a limitation on the scope of the invention as it is described in the appended claims. It should be understood that it is expressly contemplated that the following claims may be combined in any order, unless such combination would result in a claimed structure containing incompatible recitations. All United States patents, published patent applications and allowed patent applications identified above are incorporated herein by reference.

What is claimed is:
1. A composition suitable for use in extrusion coating applications, comprising:

a. from 40 to 90% by weight of the composition of a first polyethylene composition, said first polyethylene composition comprising a linear low density polyethylene having a density in the range of from 0.90 to 0.92 g/cm³, and a melt index ($I_2$) of from 7 to 15 g/10 min; and
b. from 1 to 3.5% by weight of the composition of a second polyethylene composition, said second polyethylene composition comprising a high pressure low density polyethylene having a density in the range of from 0.915 to 0.930 g/cm³, and a melt index ($I_2$) of from 0.4 to 1 g/10 min; and
c. from 10 to 50% by weight of the composition of a third polyethylene composition, said third polyethylene composition comprising a high pressure low density polyethylene having a density in the range of from 0.915 to 0.930 g/cm³, and a melt index ($I_2$) of from 5 to 12 g/10 min;
wherein the total composition is characterized by the following relationship between a melt strength of the composition and a melt index of the composition the Melt strength×the Melt index ($I2$)>24.

2. The composition of claim 1 wherein the first polyethylene composition is multimodal composition in terms of average molecular weight.

3. The composition of claim 1 wherein the first polyethylene composition has a MWD greater than 4.

4. The composition of claim 1 wherein the first polyethylene composition has a MWD less than 4.

5. The composition of claim 1 wherein the first polyethylene composition has a density of from 0.905 to 0.92 g/cm³.

6. The composition of claim 1 wherein the first polyethylene composition has a melt index of from 7 to 12 g/10 min.

7. The composition of claim 1 wherein the first polyethylene component comprises from 60 to 80% by weight of the composition.

8. The composition of claim 1 wherein the third polyethylene composition has a melt index in the range of from 7 to 12 g/10 min.

9. The composition of claim 1 where the total composition has a melt index of from 5 to 15 g/10 min.

10. The composition of claim 1 where the total composition has a melt index of from 7 to 12 g/10 min.

11. The composition of claim 1 where the total composition has a density of from 0.90 to 0.96 g/cm³.

12. The composition of claim 1 further comprising one or more additives selected from the group consisting of slip agents, antiblocking agents, anti-static agents, antioxidants and anti-fog agents.

* * * * *